US006212282B1

(12) United States Patent
Mershon

(10) Patent No.: US 6,212,282 B1
(45) Date of Patent: Apr. 3, 2001

(54) WIRELESS SPEAKER SYSTEM

(76) Inventor: Stuart Mershon, 300 Winston Dr., Cliffside Park, NJ (US) 07010

( * ) Notice: Subject to any disclaimer, the term of this patent is extended or adjusted under 35 U.S.C. 154(b) by 0 days.

(21) Appl. No.: 08/962,288

(22) Filed: Oct. 31, 1997

(51) Int. Cl.[7] ...... H04B 3/00
(52) U.S. Cl. ...... 381/77; 381/311; 455/6.3
(58) Field of Search ...... 381/3, 311, 77, 381/6, 74, 79, 2; 455/3.1, 5.1, 6.1, 6.3; 348/7, 12, 13; 379/102.01

(56) References Cited

U.S. PATENT DOCUMENTS

| | | | |
|---|---|---|---|
| 4,685,133 | 8/1987 | Iggulden | 381/3 |
| 4,845,751 | 7/1989 | Schwab . | |
| 5,113,428 | 5/1992 | Fitzgerald . | |
| 5,247,293 | 9/1993 | Nakagawa . | |
| 5,465,401 | 11/1995 | Thompson . | |
| 5,495,357 | 2/1996 | Osterhout . | |
| 5,497,502 | 3/1996 | Castille . | |
| 5,551,065 | 8/1996 | Honore . | |
| 5,553,312 | 9/1996 | Gattey et al. . | |
| 5,628,055 | 5/1997 | Stein . | |
| 5,854,985 | 12/1998 | Sainton et al. . | |
| 6,014,236 * | 1/2000 | Flaherty | 359/118 |

* cited by examiner

*Primary Examiner*—Vivian Chang
(74) *Attorney, Agent, or Firm*—Kenyon & Kenyon

(57) ABSTRACT

A wireless speaker system includes a remote speaker device cooperating with a transmission unit. The remote speaker device includes a remote wireless communication device connected to a speaker via a digital to analog converter. The remote speaker device also includes a keypad. The transmission unit comprises an analog to digital converter and a source wireless communication device. The transmission unit may be connected to a home audio source such as a stereo. The transmission unit may also include a control device for controlling the home audio source via the keypad. The wireless speaker system allows access to a home audio system from virtually any location.

21 Claims, 3 Drawing Sheets

WIRELESS SPEAKER SYSTEM

FIELD OF THE INVENTION

The present invention relates to a wireless speaker system for use with a home audio system, particularly a wireless speaker system in the form of wireless headphones.

BACKGROUND OF THE INVENTION

Wireless headphones or speakers that receive musical signals transmitted directly from home stereo systems or portable music players are known. These known headphones or speakers receive signals over prescribed electromagnetic bands, specifically in the 900 MHz range. Currently, such signals are limited in range by regulation, having a maximum range of 150 feet. Even without regulation, technological factors (for example signal strength) severely limit the range of known wireless headphone and speaker systems, making long-distance use impossible.

Typically, known wireless headphones are used around the home and allow the listener to move from room to room without the distraction or nuisance of a cord. The listener has full use of all stereo systems, such as radio, cassette, and compact disc player, but cannot move far from the audio source. Wireless headphone units may also transmit some functional instructions to the stereo system. Such a device is disclosed, for example, in U.S. Pat. No. 4,845,751 to Schwab.

In addition, known wireless headphones may be used outside the home in conjunction with portable music players, for example while jogging. In this case, the listener can move freely without the risk of getting tangled in a headphone cord. However, the listener has access only to the music system available on the portable music player, usually a cassette player or a compact disc player, and can only choose among those cassette tapes or compact discs the listener carries. Also, the listener must transport the portable music player. Carrying the portable music player can be cumbersome, and movement often causes a portable player, especially one that plays compact discs, to skip.

It is known from U.S. Pat. No. 5,628,055 to Schwab to provide a modular telecommunications device for an electronic unit such as a laptop computer. The disclosed arrangement allows access to network, internet, and other computerized services via a wireless (e.g. cellular) network.

It is also known from U.S. Pat. No. 5,465,401 to Thompson to provide a hand held communication unit including a modem, wireless communication, a touchpad, and a display that also allows voice communication. The unit performs services such as voice-mail and voice communications, information retrieval, and on-line data base services.

It is desirable to provide a system by which a listener can access his or her home audio system from long distances and without the troublesome inconvenience of carrying a portable electronic device.

SUMMARY OF THE INVENTION

It is an object of the present invention to allow a listener to receive music from his or her home audio system while away from home.

It is a further object of the present invention to provide long distance, cordless access to the listener's home audio system.

In accordance with the present invention, a wireless speaker system includes, for example, a remote speaker device that cooperates with a transmission unit for a home audio system. The remote speaker device may be arranged, for example, in the form of headphones or in the form of a pair of standard audio speakers. Alternatively, the remote speaker device may be incorporated, for example, into an audio system such as a car radio. The transmission unit receives signals from a home audio source and transmits the signals to the remote speaker device via a wireless communication network, for example a digital wireless network.

The remote speaker device includes, for example, a wireless communications device, a digital to analog ("D/A") converter for converting digital audio signals to analog audio signals, and a speaker. The remote speaker device may also include a keypad for dialing into a home audio system and inputting commands to the home audio system, as well as a display such as an LED display. In the headphones arrangement, the modem, wireless communication device, D/A converter, keypad, and display may all be included in the headband of the headphones.

The wireless speaker system also includes a transmission unit connected to the home audio system, for example a home stereo or personal computer. The transmission unit receives an audio signal from the home audio system, converts the audio signal into a digital audio signal using an analog to digital ("A/D") converter, and transmits the digital audio signal to the remote speaker device via a wireless communication device. The transmission unit may also receive command signals from the remote speaker device and send the signals to the home audio unit via a control device. Because the system of the present invention transmits signals via wireless communication line or network rather than directly via radio signal, the system is not limited in range. It is therefore an advantage of the present invention that the listener can receive music from his or her home audio system from virtually anywhere in the world.

A further advantage of the present invention is that the listener has access to the full range of musical options available on a home audio system.

A further advantage of the present invention is that the listener need not carry a portable music device.

A further advantage of the present invention is that the listener is free to move about without the audio source skipping.

A further advantage of the present invention is that it may be used in conjunction with other speaker systems, including car speakers or portable speakers.

DETAILED DESCRIPTION OF THE INVENTION

Figure 1:
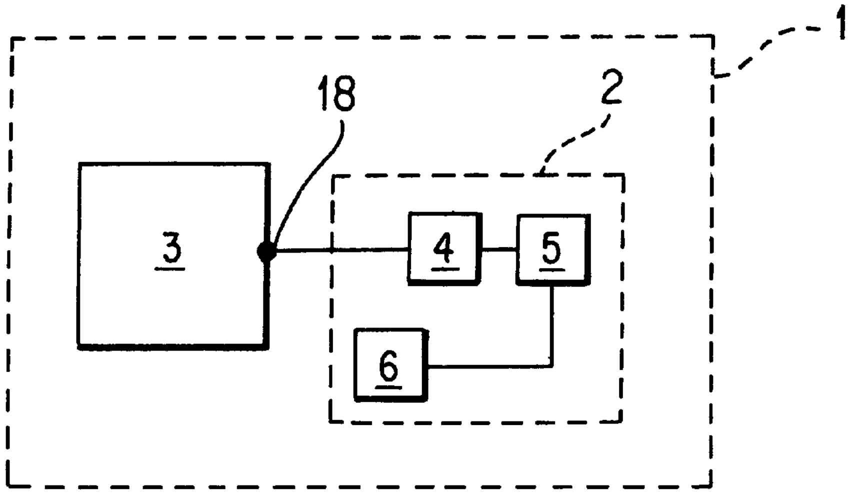
FIG. 1 shows a schematic view of a home audio source system with a transmission unit according to the present invention.

FIG. 1 shows a home audio system 1 with a transmission unit 2 according to the present invention. The home audio system 1 includes a home audio source 3. The home audio source 3 typically may be a home stereo, including an am/fm receiver, cassette player, compact disc player, digital audio tape player, and/or other stereo components. Many such stereo systems hold, for example, multiple compact discs from which listener may choose. The home audio source 3 may also include, for example, a home computer. Many home computers are capable of playing audio compact discs, and may in the future handle other home audio sources or mediums.

The home audio system 1 also includes a transmission unit 2 comprising, for example, an A/D converter 4 and a source wireless communication device 5. Currently, standard telephone lines, including analog wireless networks, do not have an adequate bandwidth to transmit full stereo sound without significant degradation of the signal. Accordingly, in the preferred embodiment, the source wireless communication device 5 (and the remote wireless communication device 15, described below) is a digital device, adapted for use with, for example, a digital wireless telephone network (not shown). The A/D converter 4 converts the standard audio output signal from the home audio source 3 into a digital signal adapted for transmission over a digital wireless network.

Figure 2:
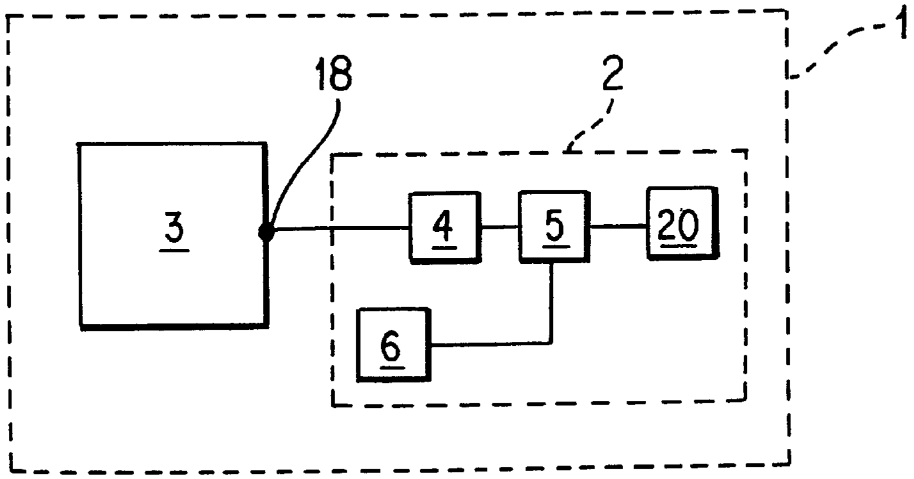
FIG. 2 shows a schematic view of a home audio system with an alternative embodiment of a transmission unit according to the present invention.

The wireless speaker system according to the present invention is compatible with analog wireless networks. FIG. 2 shows an alternative system according to the present invention adapted for such a network. In this arrangement, the output from the A/D converter 4 may be converted, for example, by a modem 20 into an analog signal for transfer over an analog wireless network (not shown). Thus any wireless communication system allowing wireless transfer of information or sound over distance is sufficient for purposes of the present invention.

Figure 3:
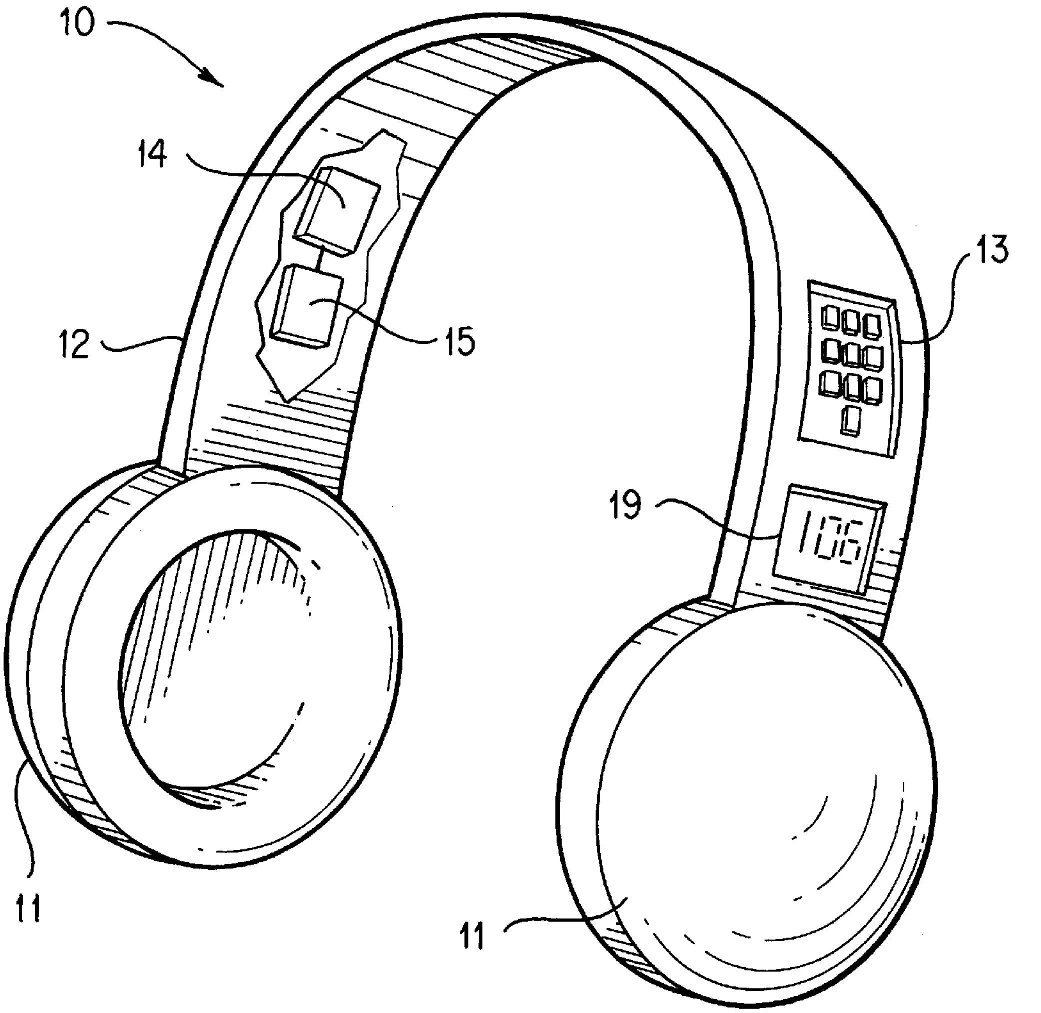
FIG. 3 shows a perspective view of a remote speaker device according to the present invention.

FIG. 3 shows a wireless speaker device 10 according to the present invention arranged, for example, as headphones having speakers 11 adapted to cover the ears of a listener. In the headphones arrangement of the wireless speaker device 10, the speakers 11 may be connected by a headband 12. A remote wireless communication device 15, preferably located in the headband 12, receives an audio signal and transmits the audio signal to the speakers 11 via, for example, a D/A converter 14. D/A converter 14 is also located, for example, in the headband 12.

The wireless speaker device 10 also includes an associated keypad 13 and may include a display 19, for example an LED or similar display. The keypad 13 may be used, for example, for contacting, connecting to, and commanding the home audio source 3 via the remote wireless communication device 15 and transmission unit 2. The keypad 13 may contain keys available on a standard telephone, for example a cellular phone, alphanumeric keys, and typical command keys available on a home audio source, for example a power key, input source key (to choose among audio components), play, skip, stop, etc., and other useful keys normally present on remote controls or audio units. The display 19 can provide the listener with information such as input source, track number, etc. The keypad 13 and display 19 may be located, for example, on the headband 12.

Referring again to FIGS. 1–3, in one embodiment of the present invention the transmission unit 2 may be connected to an output 18 of the home audio source 3, for example a standard headphone output. In this case, the transmission unit 2 may also include a control device 6 capable of receiving commands from the keypad 13 (via the communication devices 15, 5) and relaying those commands to the home audio source 3. The control device 6 may be, for example, a so-called "universal" remote control, capable of storing proper frequencies and codes for remote control of various electronic devices. Using the normal remote control of the home audio source 3, the listener may then simply program the control device 6 to transmit the proper commands in response to the listener pressing the appropriate buttons on the keypad 13. It can be noted that commands from the keypad 13 may be in a digital format and that the control device 6 may be arranged to accept digital commands. In this manner, commands from the keypad 13 may, for example, be transmitted directly through the remote wireless communication device 15 and the source wireless communication device 5 without passing through the D/A converter 14 or the A/D converter 4.

Figure 4:
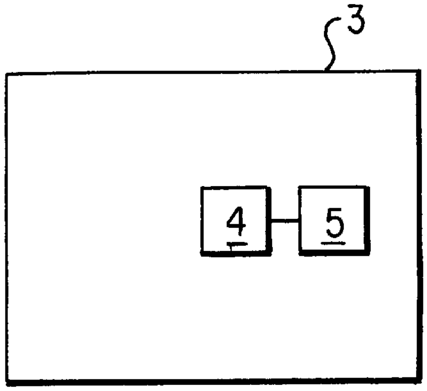
FIG. 4 shows a schematic view of a home audio source according to the present invention.

FIG. 4 shows an alternative arrangement of the home audio source 3 and the transmission unit 2. In this arrangement, the home audio source 3 and the transmission unit 2 are arranged as one unit (for example, with the transmission unit 2 located inside the home audio source 3). In this arrangement, the home audio source 3 may be configured to receive commands directly from the keypad 13 via wireless communication devices 15, 5 without the need for the control device 6. The wireless speaker system as described above and as shown in FIGS. 1–4 allows the listener access to his or her home audio system from virtually any distance. The listener is free to move about and perform activities without the nuisance or distraction of a headphone cord and without having to carry a portable music device. In addition, the listener has access to all the features and capabilities of a home audio source 3. Using the keypad 13, the user may simply dial into the home audio system 1 and choose a selection available on the home audio source 3.

Figure 5:
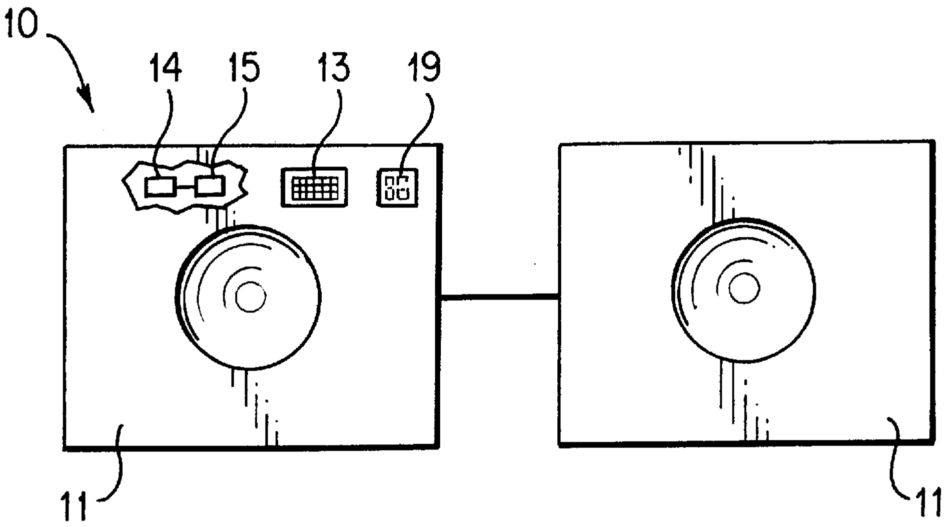
FIG. 5 shows an alternative embodiment of a remote speaker device according to the present invention.

FIG. 5 displays an alternative embodiment of the remote speaker device 10. In this embodiment, the remote speaker device 10 is not arranged as headphones, but rather in the form of a standard audio speaker 1l. Preferably, the remote speaker device 10 according to this embodiment of the present invention includes, for example, a pair of standard audio speakers 11. The D/A converter 14 and remote wireless communication device 15 are preferably located in one of the speakers 11, while the keypad 13 and, if present, the display 19 are also preferably located on one of the speakers 11. In this embodiment, the remote speaker device 10 according to the present invention is particularly suitable for use while traveling, for example in a car, or while otherwise away from home. In this embodiment, the speakers 11 may also include, for example, an internal amplifier (not shown). The remote speaker device 10 may be powered by a/c current from a standard outlet or by direct current from batteries or, for example, a standard power converter for a car cigarette lighter.

Figure 6:
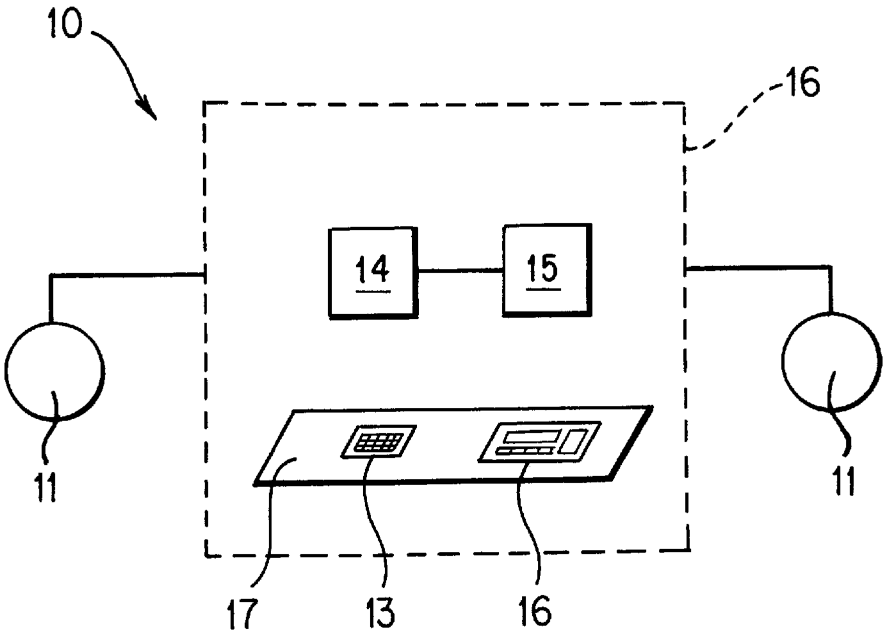
FIG. 6 shows a schematic view of another alternative embodiment of a remote speaker device according to the present invention.

Another alternative arrangement of the remote speaker device 10 is shown in FIG. 6. In this arrangement the remote speaker device 10 is incorporated as part of a car audio system. In this embodiment, the speakers 11 are, for example, standard automobile speakers. The keypad 13 and display 19 are located, for example, on the face 17 of the car radio 16, while the D/A converter 14 and remote wireless communication device 15 are located in the interior of the car radio 16 or otherwise behind the dashboard. The keypad 13 may be used to control all of the functions of the car radio 16, with individual keys controlling multiple functions as is common in many car audio systems.

What is claimed is:

1. A wireless speaker system, comprising:

a transmission unit, the transmission unit including:

an analog to digital converter adapted for connection to an output of a home audio source; and a source wireless communication device connected to the analog to digital converter; and a remote speaker device, the remote speaker device including:

a remote wireless communication device;

a digital to analog converter connected to the remote wireless communication device;

a speaker connected to the digital to analog converter; and a keypad connected to the remote wireless communication device;

wherein the home audio source transmits audio signals to the remote speaker device via the transmission unit, the signals being transmitted at least in part via a wireless telephone network; and wherein the keypad sends command signals to the home audio source via the remote wireless communication device and the transmission unit, the command signals being transmitted at least in part via the wireless telephone network.

2. The wireless speaker system according to claim 1, wherein the remote speaker device is arranged as headphones, and wherein the remote wireless communication device, the digital to analog converter, and the keypad are disposed in a headband of the headphones.

3. The wireless speaker system according to claim 1, wherein the speaker is disposed in the interior of an automobile, the remote wireless communication device and the digital to analog converter are disposed inside a car radio of the automobile, and the keypad is disposed on a face of the car radio.

4. The wireless speaker system according to claim 1, wherein the transmission unit further comprises a control unit, wherein the control unit is connected to the source wireless communication device, and wherein the control unit receives the command signals from the keypad via the remote wireless communication device and the source communication device and relays the command signals to the home audio source.

5. The wireless speaker system according to claim 4, wherein the remote speaker device is arranged as headphones, and wherein the remote wireless communication device, the digital to analog converter, and the keypad are disposed in a headband of the headphones.

6. The wireless speaker system according to claim 4, wherein the speaker is disposed in the interior of an automobile, the remote wireless communication device and the digital to analog converter are disposed inside a car radio of the automobile, and the keypad is disposed on a face of the car radio.

7. The wireless speaker system according to claim 1, wherein the transmission unit further includes a source modem connected to the source wireless communication device and wherein the remote speaker device further includes a remote modem connected to the remote wireless communication device.

8. The wireless speaker system according to claim 7, wherein the remote speaker device is arranged as headphones, and wherein the remote wireless communication device, the digital to analog converter, and the keypad are disposed in a headband of the headphones.

9. The wireless speaker system according to claim 7, wherein the speaker is disposed in the interior of an automobile, the remote wireless communication device and the digital to analog converter are disposed inside a car radio of the automobile, and the keypad is disposed on a face of the car radio.

10. A wireless speaker system, comprising:

a home audio source having an output;

a transmission unit, the transmission unit including:

an analog to digital converter connected to the output of the home audio source; and a source wireless communication device connected to the analog to digital converter; and a remote speaker device, the remote speaker device including:

a remote wireless communication device;

a digital to analog converter connected to the remote wireless communication device;

a speaker connected to the digital to analog converter; and a keypad connected to the remote wireless communication device;

wherein the home audio source transmits audio signals to the remote speaker device via the transmission unit, the audio signals being transmitted at least in part via a wireless telephone network; and wherein the keypad sends command signals to the home audio source via the remote wireless communication device and the transmission unit, the command signals being transmitted at least in part via the wireless telephone network.

11. The wireless speaker system according to claim 10, wherein the remote speaker device is arranged as headphones, and wherein the remote wireless communication device, the digital to analog converter, and the keypad are disposed in a headband of the headphones.

12. The wireless speaker system according to claim 10, wherein the speaker is disposed in the interior of an automobile, the remote wireless communication device and the digital to analog converter are disposed inside a car radio of the automobile, and the keypad is disposed on a face of the car radio.

13. The wireless speaker system according to claim 10, wherein the transmission unit further comprises a control unit, wherein the control unit is connected to the source wireless communication device, and wherein the control unit receives the command signals from the keypad via the remote wireless communication device and the source communication device and relays the command signals to the home audio source.

14. The wireless speaker system according to claim 13, wherein the remote speaker device is arranged as headphones, and wherein the remote wireless communication device, the digital to analog converter, and the keypad are disposed in a headband of the headphones.

15. The wireless speaker system according to claim 13, wherein the speaker is disposed in the interior of an automobile, the remote wireless communication device and the digital to analog converter are disposed inside a car radio of the automobile, and the keypad is disposed on a face of the car radio.

16. The wireless speaker system according to claim 10, wherein the transmission unit further includes a source modem connected to the source wireless communication device and wherein the remote speaker device further includes a remote modem connected to the remote wireless communication device.

17. The wireless speaker system according to claim 16, wherein the remote speaker device is arranged as headphones, and wherein the remote wireless communication device, the digital to analog converter, and the keypad are disposed in a headband of the headphones.

18. The wireless speaker system according to claim 16, wherein the speaker is disposed in the interior of an automobile, the remote wireless communication device and the digital to analog converter are disposed inside a car radio of the automobile, and the keypad is disposed on a face of the car radio.

19. A wireless speaker system, comprising:

a home audio source having a transmission unit, the transmission unit including:

an analog to digital converter; and a source wireless communication device connected to the analog to digital converter; and a remote speaker device, the remote speaker device including:

a remote wireless communication device;

a digital to analog converter connected to the remote wireless communication device;

a speaker connected to the digital to analog converter; and a keypad connected to the remote wireless communication device;

wherein the home audio source transmits audio signals to the remote speaker device via the transmission unit, the audio signals being transmitted at least in part via a wireless telephone network; and wherein the keypad sends command signals to the home audio source via the remote wireless communication device and the transmission unit, the command signals being transmitted at least in part via the wireless telephone network.

20. The wireless speaker system according to claim 19, wherein the remote speaker device is arranged as headphones, and wherein the remote wireless communication device, the digital to analog converter, and the keypad are disposed in a headband of the headphones.

21. The wireless speaker system according to claim 19, wherein the speaker is disposed in the interior of an automobile, the remote wireless communication device and the digital to analog converter are disposed inside a car radio of the automobile, and the keypad is disposed on a face of the car radio.

* * * * *